United States Patent
Davis et al.

(10) Patent No.: US 9,387,516 B1
(45) Date of Patent: Jul. 12, 2016

(54) DEVICE AND METHOD TO ATTACH DISC TO SHAFT

(71) Applicants: Nicholas Davis, San Diego, CA (US); James D Weller, San Diego, CA (US)

(72) Inventors: Nicholas Davis, San Diego, CA (US); James D Weller, San Diego, CA (US)

(73) Assignee: CP MANUFACTURING, INC., San Diego, CA (US)

( * ) Notice: Subject to any disclaimer, the term of this patent is extended or adjusted under 35 U.S.C. 154(b) by 0 days.

(21) Appl. No.: 14/953,337

(22) Filed: Nov. 28, 2015

Related U.S. Application Data

(60) Provisional application No. 62/160,219, filed on May 12, 2015.

(51) Int. Cl.
*B07B 1/16* (2006.01)
*B07B 13/04* (2006.01)
*B07B 1/14* (2006.01)

(52) U.S. Cl.
CPC . *B07B 1/16* (2013.01); *B07B 13/04* (2013.01); *B07B 1/14* (2013.01)

(58) Field of Classification Search
CPC .............. B07B 1/14; B07B 1/15; B07B 1/16; Y10T 29/49826; Y10T 29/49549
See application file for complete search history.

(56) References Cited

U.S. PATENT DOCUMENTS

| | | | | |
|---|---|---|---|---|
| 3,306,441 A * | 2/1967 | Sanders | ..................... | B02C 4/00 209/233 |
| 4,239,119 A * | 12/1980 | Kroell | ....................... | B07B 1/15 172/548 |
| 4,402,390 A * | 9/1983 | Feeney | ................... | B65G 39/04 193/37 |
| 4,795,036 A * | 1/1989 | Williams | .................. | B07B 1/15 209/667 |
| 6,250,478 B1 * | 6/2001 | Davis | ........................ | B07B 1/46 209/314 |
| 6,264,043 B1 * | 7/2001 | Mobley | ................. | B07B 13/072 209/659 |
| 7,261,209 B2 * | 8/2007 | Duncan | ................. | B07B 1/4627 209/271 |
| 7,578,396 B1 * | 8/2009 | Garzon | ..................... | B07B 1/15 209/660 |
| 7,661,537 B1 * | 2/2010 | Sewell | ...................... | B07B 1/15 209/668 |
| 8,424,684 B2 * | 4/2013 | Campbell | ................. | B07B 1/15 209/643 |
| 8,517,181 B1 * | 8/2013 | Davis | ........................ | B07B 1/16 209/671 |
| 8,522,983 B2 * | 9/2013 | Davis | ...................... | B07B 1/155 209/261 |
| 8,800,781 B1 * | 8/2014 | Carlile, Jr. | .............. | B07B 1/155 209/671 |
| 8,991,616 B2 * | 3/2015 | Parr | .......................... | B07B 1/15 209/667 |
| 9,027,762 B2 * | 5/2015 | Davis | ........................ | B07B 1/16 209/672 |

* cited by examiner

*Primary Examiner* — Joseph C Rodriguez
(74) *Attorney, Agent, or Firm* — Manuel de la Cerra

(57) ABSTRACT

An improved multi-disc assembly and method for releasable attachment to a shaft of a disc screen apparatus. A multi-disc hub includes multiple discs configured for use in a material separation screen of a disc screen apparatus, and has a through bore configured for direct engagement over the shaft of a material separation screen. The multi-disc hub is comprised of at least two parts that detach from each other, and at least one part comprises a portion of the through bore cross-sectional area that is less than or equal to half of the total through-bore cross-sectional area. A fastener is adapted to attach at least one hub part to the shaft, and the fastener provides a force that is greater than the force of gravity to temporarily retain the hub part onto the shaft when the shaft is rotated.

11 Claims, 8 Drawing Sheets

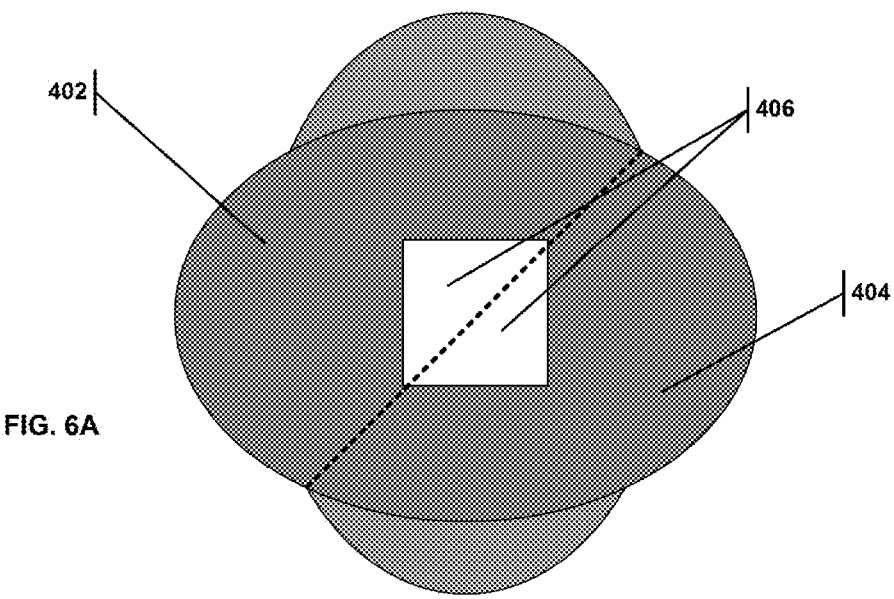
FIG. 6A
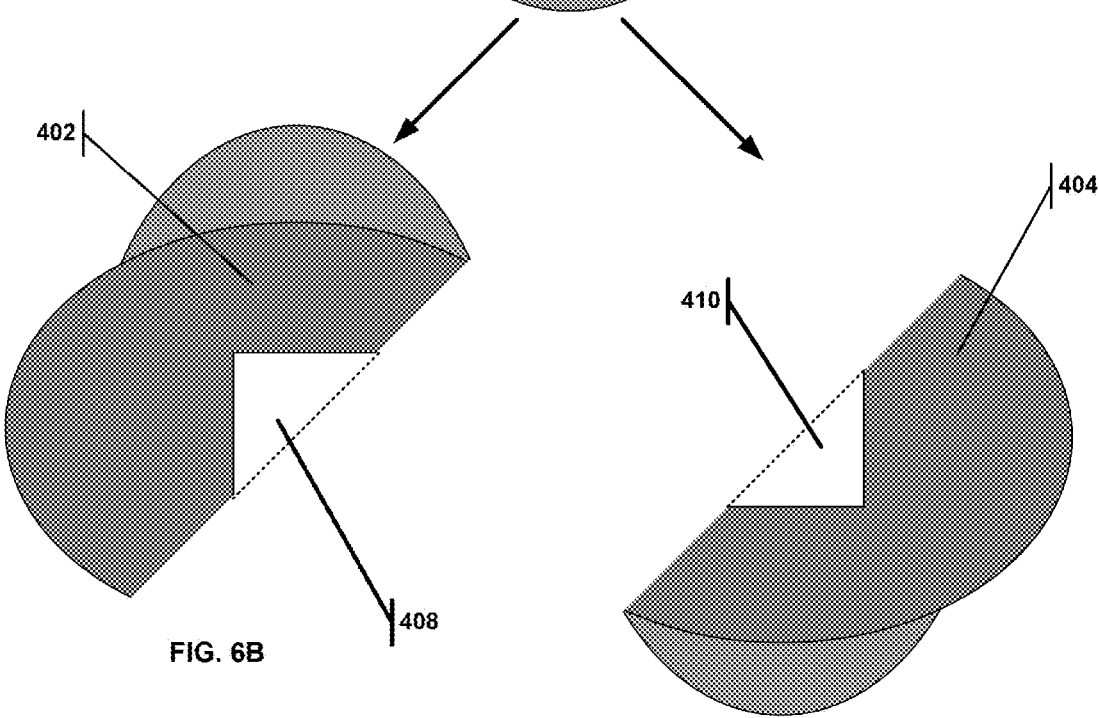
FIG. 6B
FIG. 6C

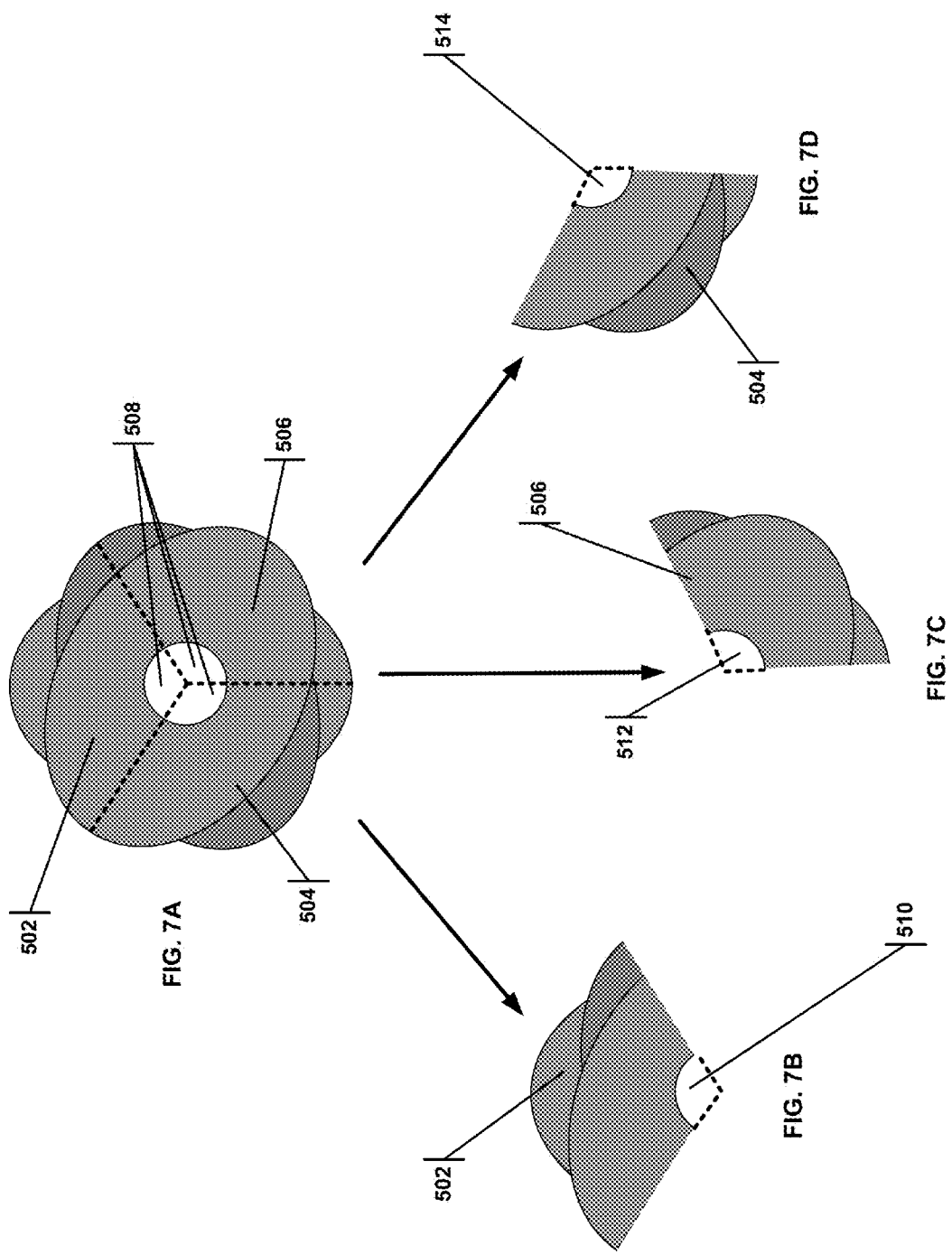

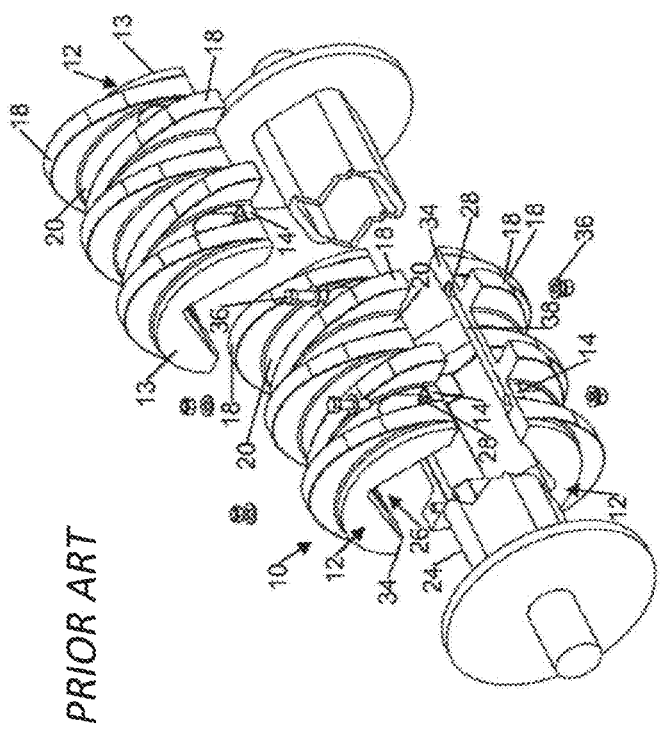
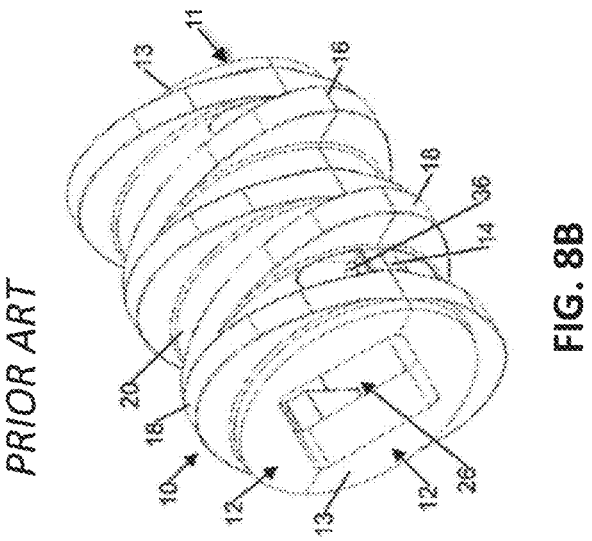
FIG. 8A PRIOR ART
FIG. 8B PRIOR ART

DEVICE AND METHOD TO ATTACH DISC TO SHAFT

1.0 TECHNICAL FIELD

The present invention relates to machines used to separate particulate materials or mixed recyclable materials into difference fractions, and more particularly, to a disc assembly for a disc screen that allows its discs to be more easily removed and replaced.

2.0 RELATED APPLICATIONS

This application is related to U.S. Pat. No. 8,517,181 entitled "MULTI-DISC ASSEMBLY FOR DISC SCREEN" issued on Aug. 27, 2013; and U.S. Pat. No. 9,027,762 entitled "MULTI-DISC ASSEMBLY FOR DISC SCREEN" issued on May 12, 2015; both of which are assigned to the same assignee as the present application. This application is also related to U.S. Patent Application 62/037,038 filed on Aug. 13, 2014, converted to non-provisional application Ser. No. 14/797,088 filed on Jul. 11, 2015; U.S. Patent Application 62/153,901 filed on Apr. 28, 2015, converted to non-provisional application Ser. No. 14/797,090 filed on Jul. 11, 2015; U.S. Patent Application 62/60219 filed on May 12, 2015 ; U.S. Patent Application 62/153,901 filed on Apr. 28, 2015, converted to non-provisional application Ser. No. 14/811,164 filed on Jul. 28, 2015; and U.S. patent application Ser. No. 14/797,093 filed on Jul. 11, 2015; all of which are assigned to the same assignee as the present application. Each of these applications is incorporated herein by reference.

This application also claims priority as a non-provisional of U.S. Patent Application 62/238,805 filed on Oct. 8, 2015, the contents of which are incorporated herein by reference.

2.0 BACKGROUND

Disc screens have long been used to separate particulate materials such as wood chips into difference fractions, according to size. More recently, disc screens have been used to separate or classify mixed recyclable materials into respective streams of similar materials such as broken glass, containers, mixed paper and newspaper.

A disc screen typically includes a frame in which a plurality of rotatable shafts, or rotors, are mounted in a parallel relationship. A plurality of discs are mounted on each shaft and a connected drive rotates the shafts in the same direction. The discs on one shaft interleave with the discs on each adjacent shaft to form screen openings between the peripheral edges of the discs. The size of the openings determines the dimension (and thus the type) of material that will fall through the screen. Rotation of the discs, which have an irregular outer contour, agitates the mixed recyclable materials to enhance classification. The rotating discs also propel across the screen the larger articles which are too big to fall between the discs. The general flow direction extends from an input area where the stream of material pours onto the disc screen to an output where the larger articles pour off of the disc screen. The smaller articles fall between the discs onto another disc screen or a conveyor, or into a collection bin. One such disc screen is disclosed in U.S. application Ser. No. 14/797,090 filed on Jul. 11, 2015, assigned to the same assignee as this application. The contents of this patent application are incorporated herein by reference.

The discs of a disc screen normally have a central opening or bore that allows them to be slid over the end of a shaft which may have a round or square cross-section. See for example U.S. Pat. No. 4,836,388 of Bielagus, granted Jun. 6, 1989. Over time, the discs wear out and must be replaced. It is not practical to re-surface or repair damaged or worn discs without removing them from the shafts of the disc screen. However, it is tedious to dismount the ends of the shafts of a disc screen from their respective bearings so that the old discs can be removed and replaced by sliding the discs off the ends of the shafts. Moreover, if only single disc is worn out or broken, it is usually necessary to remove several discs before the damaged or broken disc can be slid off the shaft. In order to alleviate these problems, a split disc was developed by CP Manufacturing, Inc. of National City, Calif. See U.S. Pat. No. 6,318,560 of Robert M. Davis, granted Nov. 20, 2001. The split disc is comprised of two identical halves which are assembled around a shaft and tightly held together by a pair of bolt assemblies which clamp the disc to the shaft. Each disc half is made of an outer rubber portion which is stiffened with a rigid internal metal frame embedded inside the rubber portion.

While the split disc design is beneficial in removing particular discs without disturbing other discs on the shaft, typical disc screens may employ 600 or more discs. With so many discs, the process of replacing one disc at a time may still be too time-consuming. In order to alleviate these problems, multi-disc assemblies have been developed as demonstrated in U.S. Pat. No. 7,261,209 to Duncan, et al. The multi-disc assemblies comprise multiple discs that can be replaced at the same time, reducing the amount of effort in servicing a disc screen. However, the multi-disc assembly of Duncan involves a complex mounting arrangement involving a securing hub and mounting plate between the multi-disc assembly and the shaft.

A multi-disc assembly that is even more convenient to remove and install is described in U.S. Pat. Nos. 8,517,181 and 9,027,762, assigned to the same assignee as this application. The contents of these patents are incorporated herein by reference.

In disc screen systems, wrapping occurs when an object can fit through the interface opening of a screen. Therefore, it is advantageous to remove the opening from a disc screen if the disc screen is not being used for size separation. When the opening is removed, it becomes difficult to change discs on a screen because there is no way to reach through the screen to hold the disc in place when attaching a new disc. This leads to decreased performance as discs are used beyond their normal wear life.

Current designs typically require two workers to replace a disc assembly. While one worker is underneath the disc screen, holding one half of a disc screen in place, a second worker mates the second half of the disc screen and permanently fastens the halves together. In some cases, the drives must be disconnected so the entire shaft can be removed using a crane, transported to a repair facility, then reinstalled after disc replacement. This is not only dangerous for the workers, but it is also inefficient. Thus, it would be desirable to provide a device and method for attaching a disc assembly to a shaft such that the disc assembly may be removed and installed by a single worker.

3.0 SUMMARY

Disclosed is an improved multi-disc assembly for releasable attachment to a shaft of a disc screen apparatus. A multi-disc hub, which may be comprised of elastomeric material, includes multiple discs configured for use in a material separation screen of a disc screen apparatus. The hub has a through bore configured for direct engagement over the shaft of a material separation screen, and the through bore has a total cross-sectional area. The multi-disc hub is comprised of at least two parts that detach from each other, and at least one part comprises a portion of the through-bore cross-sectional area that is less than or equal to half of the total through-bore cross-sectional area.

A fastener is adapted to attach at least one hub part to the shaft, and the fastener provides a force that is greater than the force of gravity to temporarily retain the hub part onto the shaft when the shaft is rotated. In one embodiment, the fastener is a clip, and the clip creates a gripping force between the hub part and the shaft. In another embodiment, the fastener is a pin and slot, and the pin creates friction with the slot. In third embodiment, the fastener is a magnet, and the magnet creates a gripping force between the hub part and the shaft.

Also disclosed is a method for attaching this improved multi-disc assembly to a shaft of a disc screen apparatus. A first hub part is placed against the shaft such that the fastener is engaged to retain the first hub part onto the shaft, and the remaining hub parts are releasably secured together around the shaft to form the multi-disc hub. After placing the first hub part against the shaft, the shaft may be rotated before releasably securing the remaining hub parts. Rotation of the shaft may place the first hub part in an orientation substantially below the shaft. The fastener, which may be a clip, pin and slot, magnet, or the like, creates a gripping force or friction sufficient to overcome gravity and temporarily retain the hub part onto the shaft.

4.0 BRIEF DESCRIPTION OF THE DRAWINGS

Various aspects of certain example embodiments can be better understood with reference to the following figures. The components shown in the figures are not necessarily to scale, emphasis instead being placed on clearly illustrating example aspects and features. In the figures, like reference numerals designate corresponding parts throughout the different views and embodiments. Certain components and details may be omitted from the figures to improve clarity.

Figure 2:
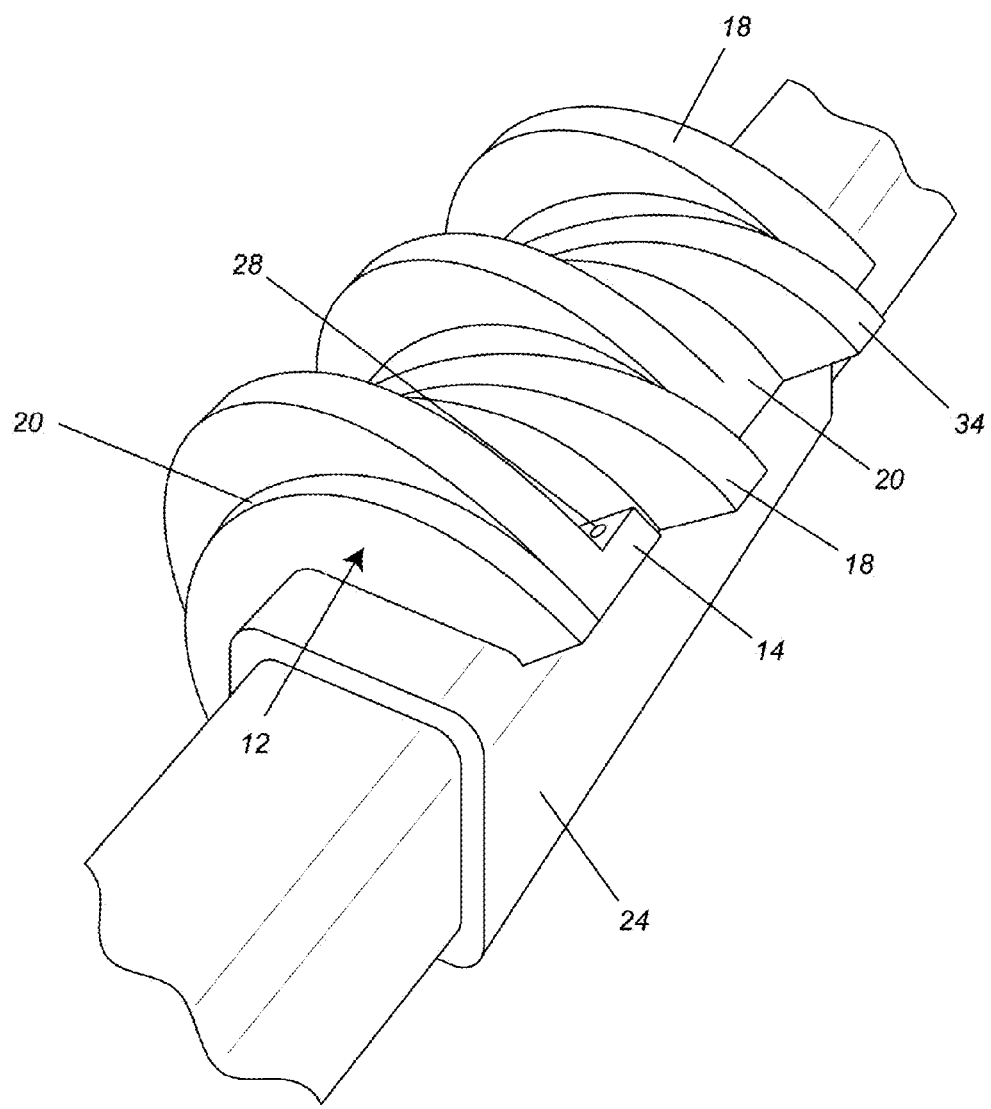
FIG. 2 is a perspective view of the hub part mounted and griped to a shaft.
Figure 3:
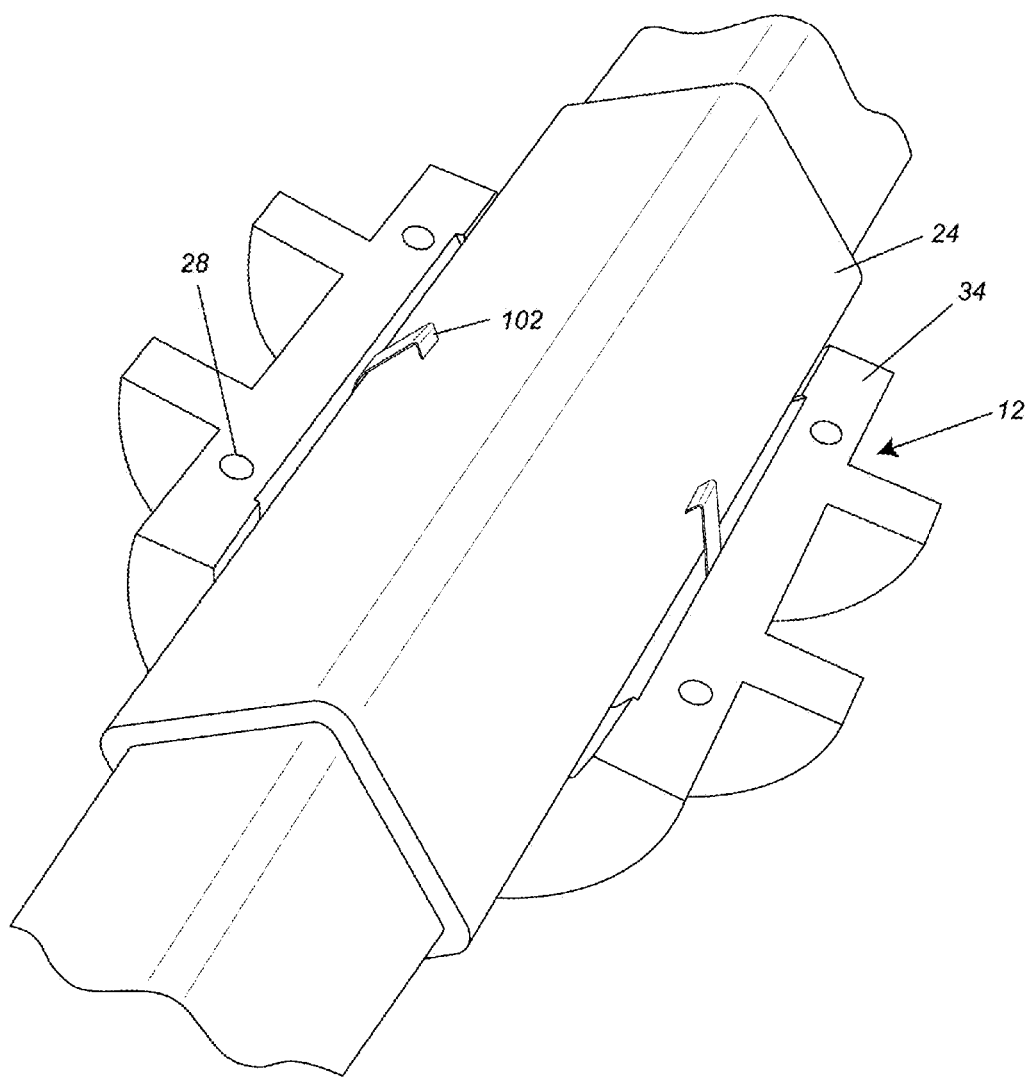

FIG. 3 a perspective view of the hub part mounted and griped to the shaft by the clip, with the shaft rotated 90 degrees from FIG. 2.

Figure 4:
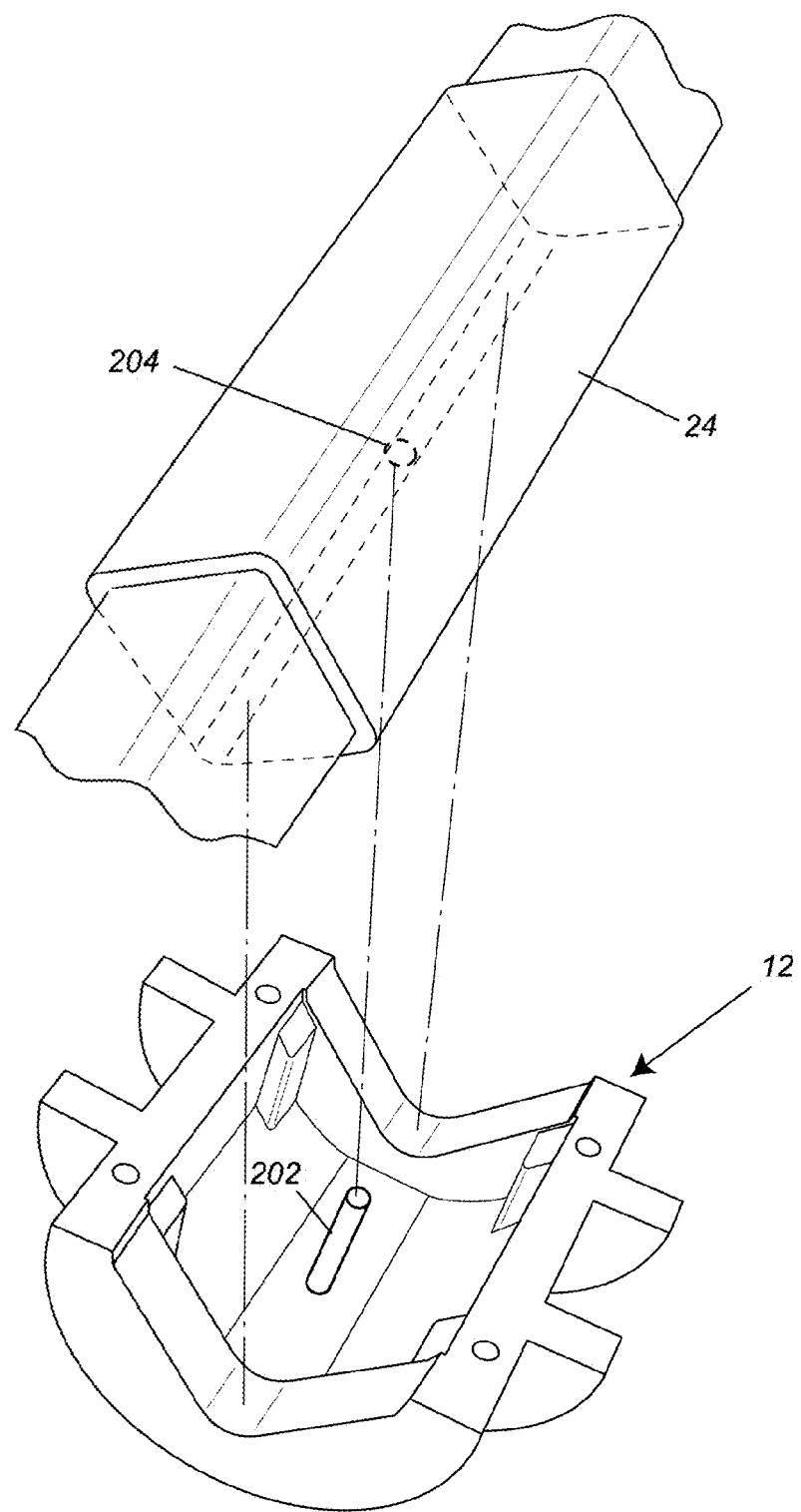

FIG. 4 is an exploded perspective view of a hub part with a pin adapted to secure the hub part to a shaft.

Figure 5:
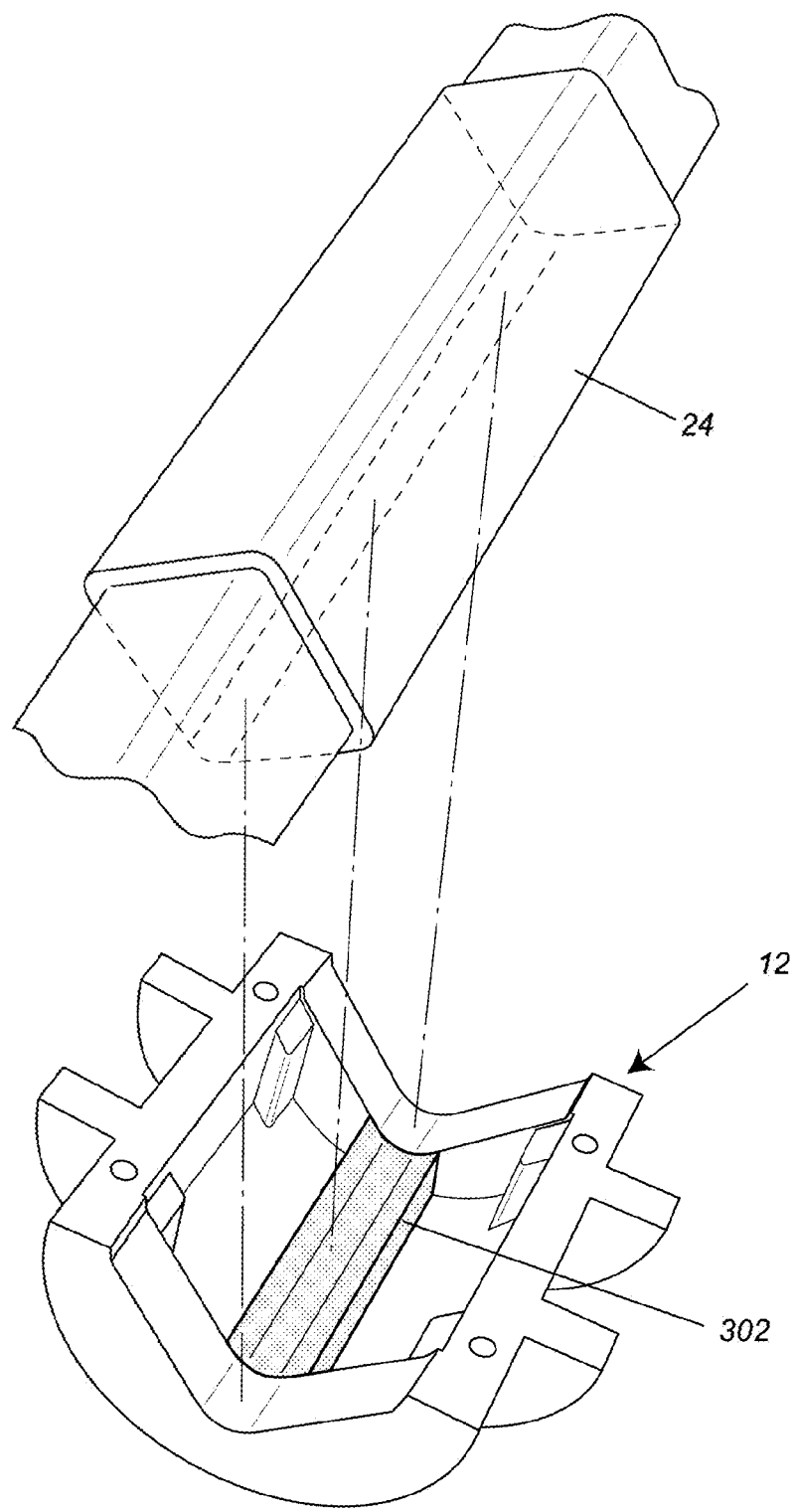

FIG. 5 is an exploded perspective view of a hub part with a magnet adapted to secure the hub part to a shaft.

FIG. 6A is cross-sectional view of a two-part multi-disc hub.

FIG. 6B is a section of FIG. 6A showing a first hub part of the two-part multi-disc hub.

FIG. 6C is a section of FIG. 6A showing a second hub part of the two-part multi-disc hub.

FIG. 7A is cross-sectional view of a three-part multi-disc hub.

FIG. 7B is a section of FIG. 7A showing a first hub part of the three-part multi-disc hub.

FIG. 7C is a section of FIG. 7A showing a second hub part of the three-part multi-disc hub.

FIG. 7D is a section of FIG. 7A showing a third hub part of the three-part multi-disc hub.

FIG. 8A is an exploded perspective view of a prior art multi-disc assembly and a shaft of a disc screen.

FIG. 8B is a perspective view of a prior art multi-disc assembly.

5.0 DETAILED DESCRIPTION OF EXAMPLE EMBODIMENTS

Following is a written description illustrating various aspects of non-limiting example embodiments. These examples are provided to enable a person of ordinary skill in the art to practice the full scope of the invention, including different examples, without having to engage in an undue amount of experimentation. As will be apparent to persons skilled in the art, further modifications and adaptations can be made without departing from the spirit and scope of the invention, which is limited only by the claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

One embodiment of a prior art multi-part disc is shown in FIGS. 8A and 8B. As disclosed in U.S. Pat. No. 8,517,181, a multi-disc assembly 10 is positioned about a hollow rectangular shaft 24 with radial corners and is configured for direct engagement with the shaft 24 when assembled. Only a portion of the shaft 24 is shown in FIG. 8A; the shaft would typically be long enough to support more multi-disc assemblies. The multi-disc assembly 10 is a multi-disc hub 11 with a plurality of multi-disc hub parts 12, which in the example of FIGS. 8A and 8B are two opposing hub halves; rigid inserts 32 located between the hub parts 12; and bolts 36 which secure the hub parts and inserts around the shaft 24. In one example, the hub part 12 contacts the shaft 24 in two areas near the end portions 13 of the hub part 12. As also shown in FIG. 2, each hub part 12 has a plurality of integrally formed discs 18 with spacers 20 positioned between adjacent pairs of the discs 18. The discs 18 are configured for engaging materials to be classified (not illustrated) and propelling the materials in a conveying direction when the multi-disc assembly 10 is rotated. A through bore 26 in multi-disc assembly 10 is configured for direct engagement with the shaft 24. The through bore 26 interfaces with the shaft 24 in order to maintain the multi-disc assembly 10 in a fixed relationship with respect to the shaft 24. One or more longitudinal separation planes (not shown) divide the multi-disc hub 11 into hub parts 12 and define radial end faces 34 of the hub parts 12. The radial end faces 34 extend on sides of the through bore 26 on each hub part 12 and may each have an elongate recess 38. Each radial end face 34 in one hub part 12 opposes the radial end face 34 in the adjacent hub part 12. Connecting portions 14 extend up to the radial end faces 34 of the hub parts 12 and may be formed in one or more of the spacers 20. The connecting portions 14 include bores 28. The bores 28 in the corresponding connecting portions 14 of adjacent hub parts 12 are aligned. Bolts 36 releasably secure adjacent hub parts 12 about the shaft 24. The bolts 36 extend through the bores 28 in the connecting portions 14 of adjacent hub parts 12. In one embodiment, the hub parts 12 are formed of an elastomeric material, i.e. a rubber-like synthetic polymer such as silicone rubber or polyurethane, which ensures that the discs 18 will have high friction impacting surfaces to maximize their propelling. The use of elastomeric material also minimizes the likelihood that glass containers will be broken.

While U.S. Pat. Nos. 8,517,181 and 9,027,762, incorporated herein by reference, disclose a multi-disc assembly for a disc screen wherein the multi-disc hub is divided into two halves, those hubs have no way of being temporarily fastened to the hub for a quick installation. Rather, the prior art multi-disc hub assemblies typically require more than one worker to replace a hub during maintenance. A second worker is needed to support the replacement hub parts which would otherwise fall off of the shaft due to gravity before being secured.

Advantageously, the device and method disclosed herein provide an improved multi-disc assembly for releasable attachment to a shaft of a disc screen apparatus, allowing for more efficient single-worker maintenance. FIGS. 1-7D disclose various embodiments of the innovation that provide a force to a hub part that overcomes the force of gravity, such that when the shaft is rotated so that a conventional multi-disc hub part would fall off the shaft, the device keeps it affixed until the other one or more parts of the hub are installed and fastened to more permanently mount the discs to the shaft. The following list of example features corresponds with FIGS. 1-7D and is provided for ease of reference, where like reference numerals designate corresponding features throughout the specification and figures:

disc screen apparatus 7
    multi-disc hub assembly 10
    multi-disc hub 11
    multi-disc hub part 12
    end portions 13
    connecting portions 14
    integrally formed discs 18
    spacers 20
    shaft 24
    through bore 26
    bores 28
    rigid inserts 32
    radial end faces 34
    bolts 36
    elongate recess 38
    fastener 100
    clip 102
    clip bolt 104
    pin 202
    slot 204
    magnet 302
    multi-disc part that is a half 402
    multi-disc part that is a half 404
    through bore total cross-sectional area 406
    half portion of total through bore total cross-sectional area 408
    half portion of total through bore total cross-sectional area 410
    multi-disc part that is a third 502
    multi-disc part that is a third 504
    multi-disc part that is a third 506
    through bore total cross-sectional area 508
    third portion of total through bore total cross-sectional area 510
    third portion of total through bore total cross-sectional area 512
    third portion of total through bore total cross-sectional area 514

Described is a manner to temporarily retain a disc of a disc screen assembly such that it will be held in place while being more permanently yet releasably attached. This device could be used in conjunction with a multi-part disc, such as the one previously described in U.S. Pat. Nos. 8,517,181 and 9,027,762, the entire disclosures of which are incorporated herein by reference.

Figure 1:
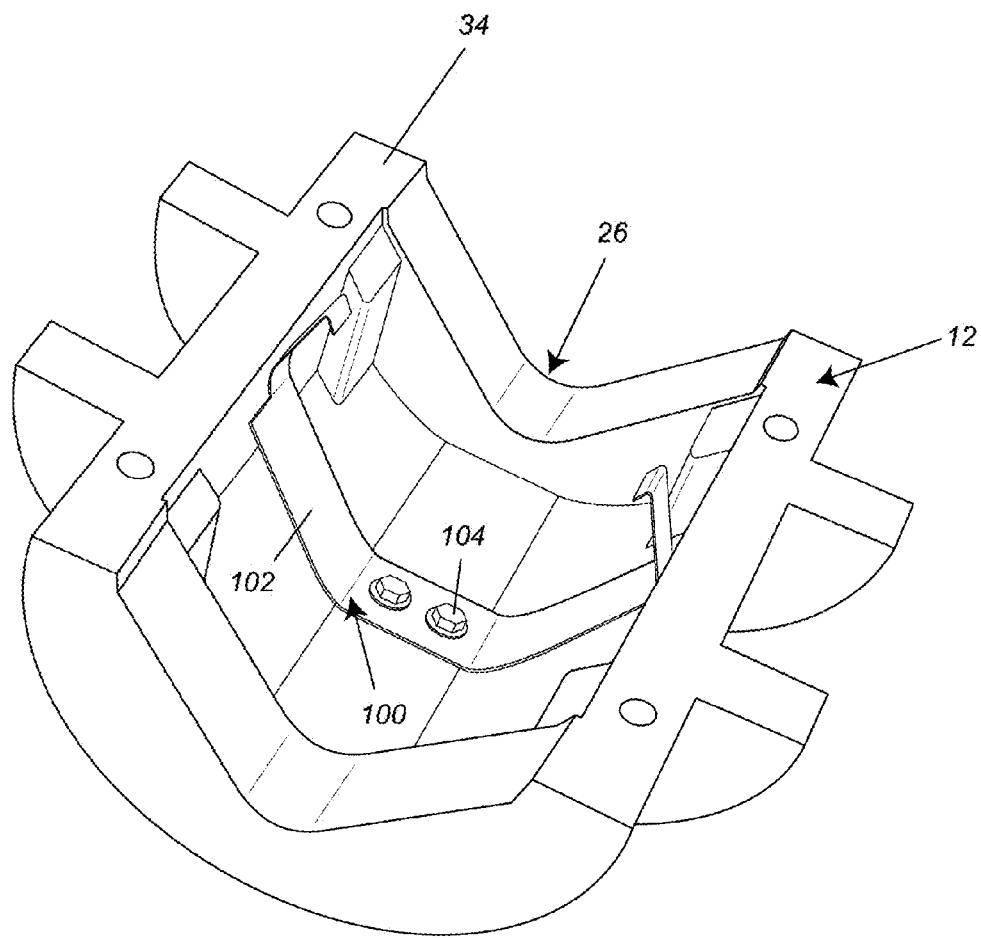
FIG. 1 is a perspective view of a multi-disc hub part with a clip adapted to secure the hub part to a shaft.

FIGS. 1 and 3 illustrate a first embodiment. Although the multi-disc hub is depicted as comprising two hub parts 12 (only one is shown), the hub could be split into another number of parts (see e.g. FIGS. 7A-7D). As shown in FIG. 1, a fastener 100 is a clip 102 which is attached to the hub part 12 at the through bore 26 by one or more bolts 104. The clip 102 is configured to grip the shaft 24, as shown in FIG. 3, so that the hub part 12 is retained temporarily on the shaft.

A second embodiment of the fastener is shown in FIG. 4. A pin 202 is attached to the hub part 12 at the through bore 26. The pin 202 passes into a slot 204 within the shaft 24. The pin 202 exerts a gripping force on the slot 204 to hold the hub part 12 onto the shaft. Alternatively, the pin may be located on shaft and inserted through a slot in the hub part.

FIG. 5 depicts a third embodiment of the fastener. A magnet 302 is attached to the hub part 12 at the through bore 26. The magnet 302 holds the hub part 12 to the metal shaft 24 until bolts 36 (shown in FIGS. 8A and 8B) are used to releasably secure the adjacent hub parts about the shaft and more permanently attach the multi-disc hub. Those of skill in the art will recognize that other types of fasteners may be employed in like fashion to the embodiments described.

While the hub is shown above as a two-part assembly, it can be divided into a different number of parts, including thirds or quarters. Depicted in FIGS. 6A-6C is a multi-disc hub having two hub parts 402, 404 configured with a through bore adapted to a square shaft. The total cross-sectional area 406 of the through bore, when the hub parts are detached from each other into a first hub part 402 and a second hub part 404, is divided into half portions to yield two through-bore cross-sectional areas 408, 410 (shown bounded by the hub part and the dashed line). The hub may also be divided into thirds as in FIGS. 7A-7C, which show a multi-disc hub having three hub parts 502, 504, 506 and a through bore adapted to a cylindrical shaft. The total cross-sectional area 508 of the through bore, when the hub is separated into a first hub part 502, a second hub part 504, and a third hub part 503, is divided into third portions to yield three through-bore cross-sectional areas 510, 512, 514 (shown bounded by the hub part and the dashed line).

Only one worker is needed to install a replacement multi-disc hub using this new innovation. For example, the worker could, from the top of the machine, temporarily attach a first hub part to the shaft 24 via a fastener 100, which may be a clip 102, pin 202 and slot 204, or magnet 302. The worker could then rotate the shaft 180 degrees, mate a second hub part, and permanently fasten both hub parts together to form the multi-disc hub. It is also possible that the worker need only have access to the top side of the machine, near the edge of the disc screen. The worker could install the multi-disc hub as just described, and then slide the hub down the shaft, repeating the process until all of the multi-disc hubs of the disc screen had been replaced along the length of the shaft. Because it is safer and quicker for only one worker to replace a disc using the device, it becomes more economical to operate the disc screen system.

The invention has been described in connection with specific embodiments that illustrate examples of the invention but do not limit its scope. Various example systems have been shown and described having various aspects and elements. Unless indicated otherwise, any feature, aspect or element of any of these systems may be removed from, added to, combined with or modified by any other feature, aspect or element of any of the systems. As will be apparent to persons skilled in the art, modifications and adaptations to the above-described systems and methods can be made without departing from the spirit and scope of the invention, which is defined only by the following claims. Moreover, the applicant expressly does not intend the following claims "and the embodiments in the specification to be strictly coextensive." *Phillips v. AHW Corp.*, 415 F.3d 1303, 1323 (Fed. Cir. 2005) (en banc).

The invention claimed is:

1. A multi-disc assembly for releasable attachment to a shaft of a disc screen apparatus, comprising:
    a multi-disc hub including multiple discs configured for use in a material separation screen of a disc screen apparatus, the hub having a through bore configured for direct engagement over the shaft of a material separation screen, and a surface circumscribing the through bore;
    wherein the multi-disc hub is comprised of at least a first part and a second hub part that detach from each other, and the first and second hub parts each comprise a portion of the surface;
    a fastener adapted to attach the first hub part to the shaft, wherein the fastener provides a force that is greater than the force of gravity to temporarily retain the first hub part onto the shaft when (1) the shaft is rotated and (2) the second hub part is not retained onto the shaft.

2. The assembly of claim 1, wherein the fastener is a clip, and wherein the clip creates a gripping force between the first hub part and the shaft.

3. The assembly of claim 1, wherein the fastener is a pin and slot, and wherein the pin creates friction with the slot.

4. The assembly of claim 1, wherein the fastener is a magnet, and wherein the magnet creates a gripping force between the first hub part and the shaft.

5. The assembly of claim 1, wherein the multi-disc hub is comprised of elastomeric material.

6. A method for attaching a multi-disc assembly to a shaft of a disc screen apparatus, comprising the steps of:
    a. providing a multi-disc hub including multiple discs configured for use in a material separation screen of a disc screen apparatus, the hub having a through bore configured for direct engagement over a shaft of a material separation screen, and a surface circumscribing the through bore; the multi-disc hub is comprised of at least a first hub part and a second hub part that detach from each other, the first and second hub parts each comprise a portion of the surface; and a fastener adapted to attach the first hub part to the shaft, wherein the fastener provides a force that is greater than the force of gravity to temporarily retain the first hub part onto the shaft when (1) the shaft is rotated and (2) the second hub part is not retained onto the shaft;
    b. placing the first hub part against the shaft such that the fastener is engaged to retain the first hub part onto the shaft; and
    c. releasably securing the second hub parts together around the shaft to form the multi-disc hub.

7. The method of claim 6, wherein the method further comprises the step of: after step (b) and before step (c), rotating the shaft.

8. The method of claim 7, wherein the rotation of the shaft places the first hub part in an orientation substantially below the shaft.

9. The method of claim 6, wherein the fastener is a clip, and wherein the clip creates a gripping force between the first hub part and the shaft.

10. The method of claim 6, wherein the fastener is a pin and slot, and wherein the pin creates friction with the slot.

11. The method of claim 6, wherein the fastener is a magnet, and wherein the magnet creates a gripping force between the first hub part and the shaft.

* * * * *